United States Patent Office 2,888,358
Patented May 26, 1959

2,888,358

METHOD OF PREPARING A COAL TAR PITCH EMULSION

Karl Krenkler, Stuttgart-Stammheim, Germany, assignor to Firma Paul Lechler, Stuttgart, Germany No Drawing. Application May 20, 1955, Serial No. 510,015. In Germany October 1, 1948

Public Law 619, August 23, 1954
Patent expires October 1, 1968

1 Claim. (Cl. 106—277)

This invention relates to an emulsion for coatings.

Emulsions used for protective coatings and packings contain binders, such as bitumen, tar, resin, artificial resin and many others, as well as emulsifiers and water, and in some cases stabilizers and finely grained inorganic substances.

These last mentioned substances are of particular importance as fillers or color pigments for high value emulsions, since the type and the structure of these substances influence to a great extent the action and the durability of the coatings produced with such emulsions. As fillers are often used finely comminuted stone flours, such as slate flour, asbestos flour, kaolin, kieselguhr, talc, limestone flour and other miners, while as color pigments, preferably oxide pigments are used, such as red and yellow iron oxide, chromium oxide and the like. Other pigments known in the painting trade, such as lithopone, titanium oxide, barium sulphate, zinc oxide, etc., are also used, depending upon the desired coloration. In the case of emulsions, the fillers and the pigments have the same purposes as the pigments have in oil paints, namely, they serve primarily as a protection of the susceptible binders against atmospheric influences. Their advantageous effects have been always combined, however, in the emulsion manufacturing art with substantial drawbacks, which are caused by the fact that these inorganic substances have essentially a more or less substantial affinity for water.

In the case of emulsions, this affinity to water retards the formation of a homogeneous coating which is decisive for its durability; furthermore, the drying process is detrimentally affected. In view of the hydrophilic character of the mineral fillers and pigments, the emulsion water escapes quite slowly from the coating, particularly at the end, and sometimes water is stubbornly retained by the outer surfaces of the mineral bodies. The holding of the water by the outer surfaces of the mineral bodies diminishes the netting by the binder, so that quite often the coating consists of a heterogeneous compound in which the filler bodies and the pigment bodies are loosely glued together with the binder instead of being thoroughly molten therewith as is desired. The hydrophilic mineral bodies act to a certain extent as water gatherers and thereby facilitate the back forming or the re-emulsification of the emulsion.

An object of the present invention is to eliminate the above described drawbacks of prior art emulsions.

Another object is to provide emulsions capable of producing a homogeneous coating.

Yet another object is the provision of a method of forming emulsions which can dry quickly.

Other objects of the present invention will become apparent in the course of the following specification.

In accordance with the present invention the surface characters of the fillers and pigments, namely their hydrophilic characters, are changed in that they become water repellent and hydrophobic. In accordance with the present invention, this is attained in that the fine grained inorganic substances are made water repellent by a preliminary treatment with water repellent substances, preferably oils having a high boiling point.

The preliminary treatment can be carried out, by way of example, in that the finely grained substances are thoroughly mixed with anthracene oil in an edge runner. In the course of this mixing, only so much oil should be added that a thin skin is formed upon the outer surface of the particles so that the material retains its pulverulent character and is easily distributed in water. The required amount of oil can be easily determined by experiment.

Other tar oils and mineral oils having a high boiling point as well as fats can be advantageously employed. When the treatment is carried out with the application of heat, it is possible to use viscous or solid fats and waxes, for example, paraffin, Vaseline, earth wax, bitumen and pitch. If substances are used which resinify under the influence of heat or in the air, or which otherwise harden, a particularly advantageous effect is produced when the hardening process is begun by the corresponding treatment of fine grained substances. This can be attained, for example, by blowing the oiled powder in a heated air current. The netting of the powder, particularly with viscous oils or solid fats, can be facilitated in that the latter are used in solution and it is possible after the treatment to eliminate and recover the solvent. In the case of porous fillers and pigments, such as kieselguhr, it is desirable to make those inner surfaces which can be reached at least partly water repellent by means of an oily or fatty substance.

The invention will appear more clearly from the following specific examples, given by way of illustration and not by way of limitation.

*Examples*

(1) To start with, a coal tar pitch emulsion is made in the usual manner of:

45 parts soft coal tar pitch
5 parts bentonite
50 parts water 25 parts asbestos powder are thoroughly mixed in an edge runner or pug mill with a mixture of 2 parts anthracene oil and
2 parts ethyl alcohol The powder thus obtained and loosely sticking together is then being added to the above mentioned coal tar pitch-emulsion and stirred until a homogeneous mixture is obtained.

(2) A bitumen emulsion is made in the usual way from:

50 parts bitumen, fusing point 40 centigrade, ring-and-ball method
5 parts emulsifying clay
45 parts water At the same time 20 parts slate flour, heated up to 70 centigrade, are throughly mixed with
2 parts wool grease and the thus obtained product is stirred into 78 parts of the heated bitumen-emulsion.

The fillers and pigments treated in the described manner do not hold water any more by adsorption as before. Consequently, emulsion water evaporates more quickly and more completely and when the skin is formed following the evaporation, the organic binder completely covers the outer surfaces of the mineral bodies which were pretreated with substances of its own type; this coating is quite thorough as compared to hydrophilic mineral bodies which have not been treated in the described fashion and upon the outer surfaces of which there remains a liquid layer which influences the melting of the binder and of the mineral.

It is apparent that the examples shown above have been given solely by way of illustration and not by way of limitation and that they are subject to many variations and modifications. All such variations and modifications are to be included within the scope of the present invention.

What is claimed is:

The method of treating emulsions, which comprises preparing a coal tar pitch emulsion from about 45 parts coal tar pitch, 5 parts bentonite and 50 parts of water, mixing 2 parts anthracene oil with 2 parts ethyl alcohol, mixing 25 parts asbestos powder with said mixture of anthracene oil and ethyl alcohol, and stirring the last-mentioned mixture into said coal tar pitch emulsion until a homogeneous mixture is formed, all parts being by weight.

References Cited in the file of this patent

UNITED STATES PATENTS

| | | |
|---|---|---|
| 1,769,442 | Loomis et al. | July 1, 1930 |
| 1,991,755 | Levin | Feb. 19, 1935 |
| 2,025,945 | Forrest | Dec. 31, 1935 |

FOREIGN PATENTS

| | | |
|---|---|---|
| 301,891 | Great Britain | May 2, 1929 |
| 118,636 | Australia | July 25, 1930 |
| 514,818 | Great Britain | Nov. 17, 1939 |
| 827,103 | Germany | Jan. 7, 1952 |